United States Patent
Julia et al.

(10) Patent No.: US 10,360,202 B2
(45) Date of Patent: Jul. 23, 2019

(54) AGNOSTIC DATA BROKER

(71) Applicant: Samsung Electronics Co., Ltd., Gyeonggi-do (KR)

(72) Inventors: Luc Julia, San Jose, CA (US); Jerome L. Dubreuil, San Jose, CA (US); Dan Serfaty, San Jose, CA (US); John Akapo, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 610 days.

(21) Appl. No.: 14/721,745

(22) Filed: May 26, 2015

(65) Prior Publication Data

US 2015/0347486 A1    Dec. 3, 2015

Related U.S. Application Data

(60) Provisional application No. 62/003,333, filed on May 27, 2014.

(51) Int. Cl.
*G06F 16/2455* (2019.01)
*G06N 3/08* (2006.01)
(Continued)

(52) U.S. Cl.
CPC .... *G06F 16/2291* (2019.01); *G06F 16/24568* (2019.01); *G06F 16/24575* (2019.01); *G06N 3/08* (2013.01)

(58) Field of Classification Search
CPC ............ G06F 17/30386; G06F 17/30528
USPC ....... 709/223, 217, 203, 226, 216, 219, 218, 709/221, 225, 230; 705/37, 14.53, 1.1, 705/7.29, 7.35, 14.1, 14.17, 14.64, 14.73, 705/26.7, 320, 35, 36 R, 40, 7.37, 7.42,
(Continued)

(56) References Cited

U.S. PATENT DOCUMENTS

| 8,447,768 B2 * | 5/2013 | Lowry ...................... G06F 7/00 707/758 |
| 2003/0093770 A1 * | 5/2003 | Fernandez ............ G06F 9/4493 717/118 |

(Continued)

FOREIGN PATENT DOCUMENTS

| JP | 2001117798 A | 4/2001 |
| JP | 2007086889 A | 4/2007 |
| WO | 00/14656 | 3/2000 |

OTHER PUBLICATIONS

International Preliminary Examination Report dated Dec. 8, 2016 (Dec. 8, 2016) for International Patent Application No. PCT/US2015/032450.
International Search Report and Written Opinion dated Sep. 2, 2015; Application No. PCT/US15/32450, filed May 26, 2015.
Extended European Search Report issued for 15800251.9 dated Oct. 19, 2017.

*Primary Examiner* — Jay A Morrison
*Assistant Examiner* — Ken Hoang
(74) *Attorney, Agent, or Firm* — Innovation Counsel LLP

(57) ABSTRACT

Exemplary embodiments are provided for integrating data into an agnostic data broker, wherein a type and structure of the data is previously unknown to the data broker. Aspects of the exemplary embodiment include ingesting the data from a data source by providing a first API through which a first API call is received that includes both the data and a manifest that describes a type of the data and the structure of the data; storing the data in a data repository; and providing a second API through which a second API call is received that queries the data based on the manifest.

20 Claims, 4 Drawing Sheets

(51) Int. Cl.
*G06F 16/22* (2019.01)
*G06F 16/2457* (2019.01)

(58) Field of Classification Search
USPC ............ 705/80; 707/741, E17.005, E17.007,
707/E17.01, E17.032, 640, 692, 999.2,
707/E17.002, E17.014, E17.045, E17.069,
707/E17.083, 654, 664, 694, 696, 722,
707/728, 737, 748, 755, 756, 759, 766,
707/793, 999.003; 711/E12.001,
711/E12.103, 162, E12.019, E12.092,
711/100, 113
See application file for complete search history.

(56) References Cited

U.S. PATENT DOCUMENTS

| | | | |
|---|---|---|---|
| 2006/0064422 A1 | 3/2006 | Arthurs | |
| 2006/0200486 A1 | 9/2006 | Castro | |
| 2009/0182472 A1 | 7/2009 | Singh | |
| 2010/0332453 A1* | 12/2010 | Prahlad | ............... G06F 11/1458 |
| | | | 707/640 |
| 2011/0055158 A1 | 3/2011 | Tapper | |
| 2011/0145712 A1 | 6/2011 | Pontier | |
| 2012/0046966 A1 | 2/2012 | Chang | |
| 2013/0212200 A1* | 8/2013 | Dennis | .................... H04L 51/22 |
| | | | 709/206 |

* cited by examiner

AGNOSTIC DATA BROKER

CROSS-REFERENCE TO RELATED APPLICATIONS

This application claims the benefit of provisional Patent Application Ser. No. 62/003,333, filed May 27, 2014 and is assigned to the assignee of the present invention and incorporated herein by reference.

BACKGROUND

The term Internet of things (commonly abbreviated as IoT) is used to denote advanced connectivity of devices, systems and services that goes beyond the traditional machine-to-machine (M2M) and covers a variety of protocols, domains and applications. In one interpretation, objects in the world, such as devices and sensors for example, equipped with machine-readable identifiers will connect to the Internet/Web via Wi-Fi, Bluetooth or low-power radio or other alternatives. According to some estimates, there will be 26-30 billion devices wirelessly connected to the Internet of things by 2020.

Collecting data from such information-sensing devices will lead to a collection of large and complex data sets or "Big Data" that need to be collected, stored and analyzed in some form of online platform. However, current big data platform architectures are limited in that they require knowledge of both the types of devices from which data will be collected as well as the type and structure of the data in order to communicate with the devices and store the data. That is, such platforms are typically customized for a specific type of application or use case (i.e., a particular domain).

An online platform that attempts to gather data from devices in the Internet of things can be designed and implemented, but because of the necessary scope of the platform and the multitude of devices that will connect to the online platform, both today and in the future, most of which the implementers of the platform will have no knowledge of, it is impossible to "program" the necessary communication protocols and intelligence into the platform at any point in time so that the platform provides a decent or relevant user experience.

Accordingly, what is needed is an improved software platform to which devices (known and unknown) are able to connect and submit data in order to provide relevant functionality to the user.

BRIEF SUMMARY

The exemplary embodiment provides methods and systems for integrating data into an agnostic data broker, wherein a type and structure of the data is previously unknown to the data broker. Aspects of the exemplary embodiment include ingesting the data from a data source by providing a first API through which a first API call is received that includes both the data and a manifest that describes a type of the data and the structure of the data; storing the data in a data repository; and providing a second API through which a second API call is received that queries the data based on the manifest.

According to the exemplary embodiments provided herein, the manifest is provided as a tool that enables the data broker platform to be agnostic, such that the data broker is able to accept data from data sources previously unknown to the data broker without requiring any software or architectural adjustments.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figure 1:
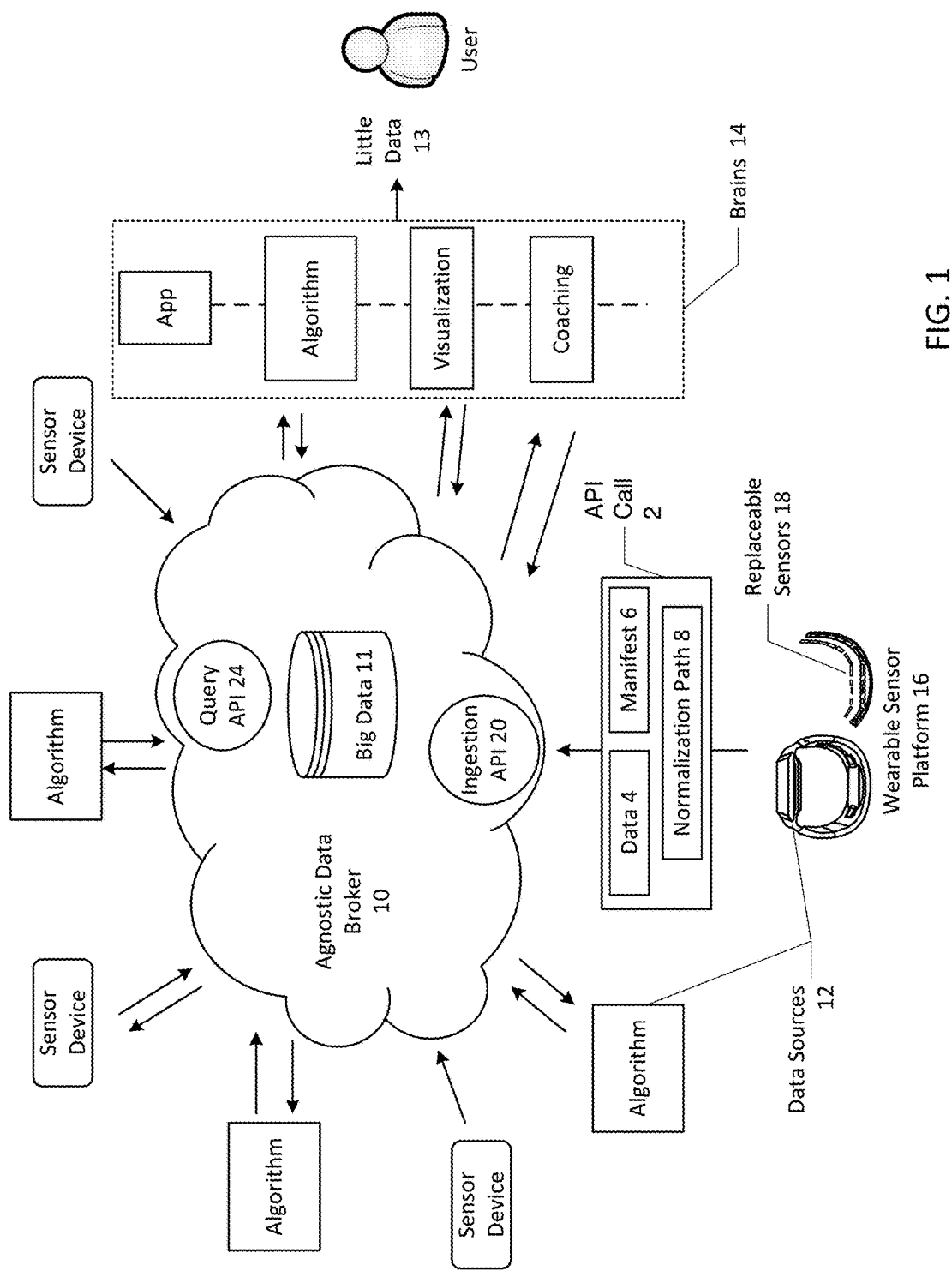
FIG. 1 is a block diagram illustrating an exemplary embodiment of a data agnostic software platform.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "component" or "module", as used herein, means, but is not limited to, a software or hardware component, such as a field programmable gate array (FPGA) or an application specific integrated circuit (ASIC), which performs certain tasks. A component or module may advantageously be configured to reside in the addressable storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components and components or modules or further separated into additional components and components or modules.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

FIG. 1 is a block diagram illustrating an exemplary embodiment of a data agnostic software platform. The exemplary embodiments comprise a software platform called the agnostic data broker 10 that is capable of ingesting data 4 output from any and all data sources 12 in the context of the Internet of things (IoT). Examples of data sources 12 include sensors and algorithms for instance. The phrase "agnostic data broker" refers to the fact that software platform is designed with the assumption that it is impossible to know the existence and structure of all existing data output from all existing data sources 12, not to mention the existence and structure of future types of data output from unknown future data sources 12. The software platform is data agnostic in that the data broker makes no assumptions or judgment regarding the type or format of the data 4 being input from the data sources 12 or of the type of stored data that the data broker provides access to.

Existing platforms/systems are locked into the type of data that they can ingest. Existing platforms must first define an ontology of the data they will work with and are therefore confined to working within a specific domain defined by that ontology. The agnostic data broker 10 does not need to define what comprises acceptable types of data. Thus, the agnostic data broker 10 is ontologically-free and domain-unlimited.

As an example of the importance of the agnostic data broker 10, consider a wearable sensor platform 16 for mobile health developed by the assignee of the present application. The wearable sensor platform 16 may be implemented as a smart watch or other wearable device that includes a smart band equipped with a variety of replaceable sensors 18 that sense physiological data from the user. The modularity of the wearable sensor platform 16 allows third parties to design and develop new types of replaceable sensors 18 that can be integrated into the band and new digital health solution apps/brains 14 that analyze the result sensor data.

The wearable sensor platform 16 may further include a charging mechanism that allows the user to charge the wearable sensor platform 16 while being worn. This particular feature allows truly continuous health monitoring, since users will have no need to take off the device, resulting in continuous streams of sensor data 4 being input to the agnostic data broker 10. The data 4 from the sensors 18 may include not only simple single heart rate and blood pressure measurements, but full, continuous raw signals that are used to calculate the heart rate and blood pressure, allowing for deeper insights into the user's health.

Accordingly, the agnostic data broker 10 is able to ingest, process and publish different types of data 4 from different types of data sources 12, including unknown future devices (e.g., the replaceable sensors 18) without any reprogramming or architectural changes.

Figure 2:
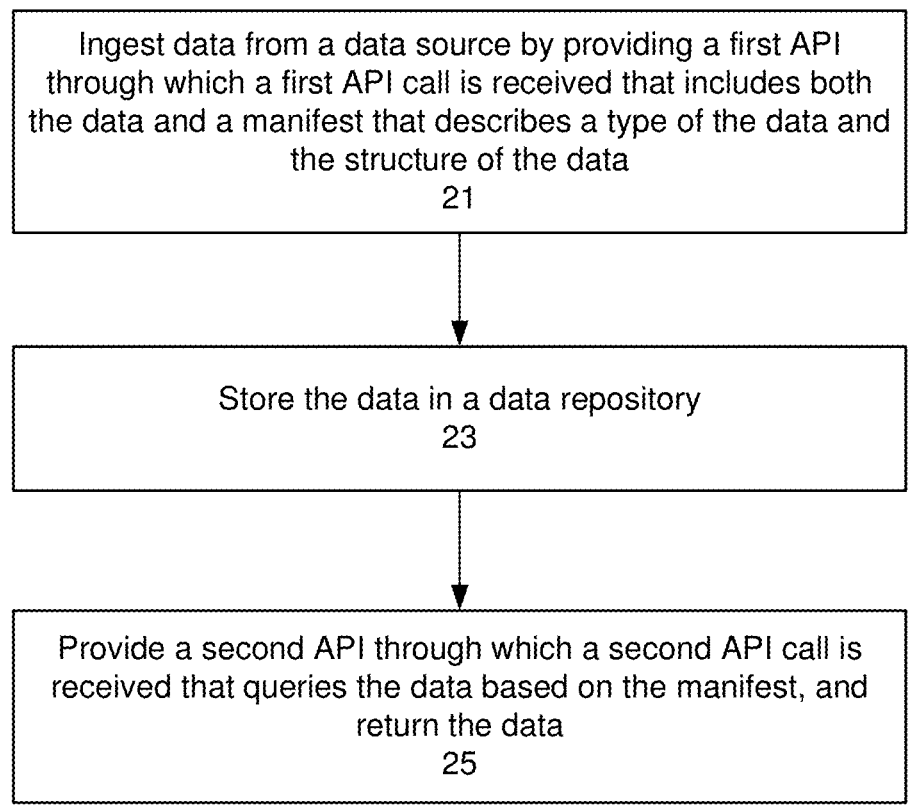
FIG. 2 is a diagram illustrating a process for integrating data into the agnostic data broker according to exemplary embodiments.

FIG. 2 is a diagram illustrating a process for integrating data into the agnostic data broker 10 according to exemplary embodiments. Referring to both FIGS. 1 and 2, software components comprising the agnostic data broker 10 may ingest the data 4 from a data source 12 by providing a first API (referred to as an ingestion API 20) through which first API calls 2 are received that include not only the data 4 to be ingested, but also a manifest 6 that describes the type and structure of the data (block 21).

In one embodiment, the manifest 6 is a tool that enables the data broker platform to be agnostic, such that the data broker is able to accept data from data sources previously unknown to the data broker without requiring any architectural adjustments. In one embodiment, the manifest 6 may be implemented as an XML file that describes the structure and format of the data 4 through an itemized list that, among other things, defines the structure and format of the data, such as whether the data 4 is in discrete blocks or is a stream. For example, an API call 2 from the wearable modular platform 16 may include a manifest 6 that specifies: thermometer temperature data is a string in block 1 of the data 4, bioimpedance sensor data is a string in blocks 2-6, heart rate sensor data is a stream, EKG sensor data is a stream, and the like.

In one embodiment, the API call 2 including the data 4 and the manifest 6 may be sent to the agnostic data broker 10 directly from the data sources 12 over a network (not shown) assuming the data source 12 is communication-enabled, e.g., a Wi-Fi or Bluetooth enabled sensor. In another embodiment, the data source 12 may be integrated into a host device, e.g., the wearable modular platform 16, which initiates the API call 2. In one embodiment, the data 4 and the manifest 6 are included in the API call 2 as arguments. In an alternative embodiment, the data 4 and the manifest 6 the data 4 may be send in different API calls.

As the data is ingested, the agnostic data broker 10 stores the data in a data repository (block 23). In one embodiment, the data 4 is stored as raw data. However, in a further embodiment, the API call 2 may optionally include as another argument a normalization path 8 that describes how the raw data is to be translated and stored into a format useful to the user. For example, a normalization path 8 for raw temperature data from a thermometer sensor on the wearable sensor platform 16 may specify that the raw temperature data should be stored in Fahrenheit or Celsius. Ingesting and storing a large amount of data 4 from a large number of data sources 12 (e.g., continuously streaming data from wearable sensor platforms 16) may be referred to as "Big Data" 11, which may be primarily of interest to third-party entities (e.g., research institutes, corporations and the like) for study and analysis.

To make the stored data accessible, the agnostic data broker 10 further provides a second API (referred to as a query API 24) through which a second API call is received that queries the data 4 based on the manifest 6, and in response, the agnostic data broker 10 returns the data (block 25). In one embodiment, the agnostic data broker 10 returns the data through a third API, as described further below.

Through the query API 24, the agnostic data broker 10 provides a platform by which different types of third party applications (apps) and algorithms/services, referred to here as brains 14, can be used to access the data 4 by issuing the second type of query API call. For example "Big Data" 11 (FIG. 1) that may be collected and saved from continuous, diverse data output from many data sources 12 may provide researchers with the opportunity to develop new Big Data-type brains 14 to analyze and aggregate the data 4 from many different users to search for correlations, observe interactions, and develop valuable scientific insights.

While Big Data 11 may be primarily helpful to large entities, "Little Data" 13 may be helpful to individuals. As used herein, Little Data 13 may refer to information about a particular user. Through selected brains 14 of interest, individual users may access Little Data-type brains 14 (e.g., coaching and visualization tools and health tracking apps) that may analyze the continuous sensor data from a particular user's wearable sensor platform 16, for example, and provide that user with feedback, encouragement, and rewards.

As shown by the arrows, the brains 14 may not only access and analyze the data 4 that was ingested into to the agnostic data broker 10, but may also feed the results of the analysis back into the agnostic data broker 10 for the results may be mixed with other data output by other data sources 12 and other brains, leading to new insights.

In one exemplary embodiment, the brains 14 may be thought of as intelligent add-ons to the agnostic data broker 10 that may be made available to users of the agnostic data broker 10. Access to both the data (in the form of Big Data 11 and Little Data 13) and the various types of brains 14 may be made available to users based on a fee-based subscription model and monetized in a variety of ways. For example, the agnostic data broker 10 may include an online store that enables users to "subscribe" to and add selected brains 14 on top of their "personal data cloud" to provide the user with relevant services. In one embodiment, the brains 14 could operate on any of the user's connected devices. That is, for a premium, users could be provided with better services and/or access to aggregated data (such as continuous heart rate information).

Figure 3:
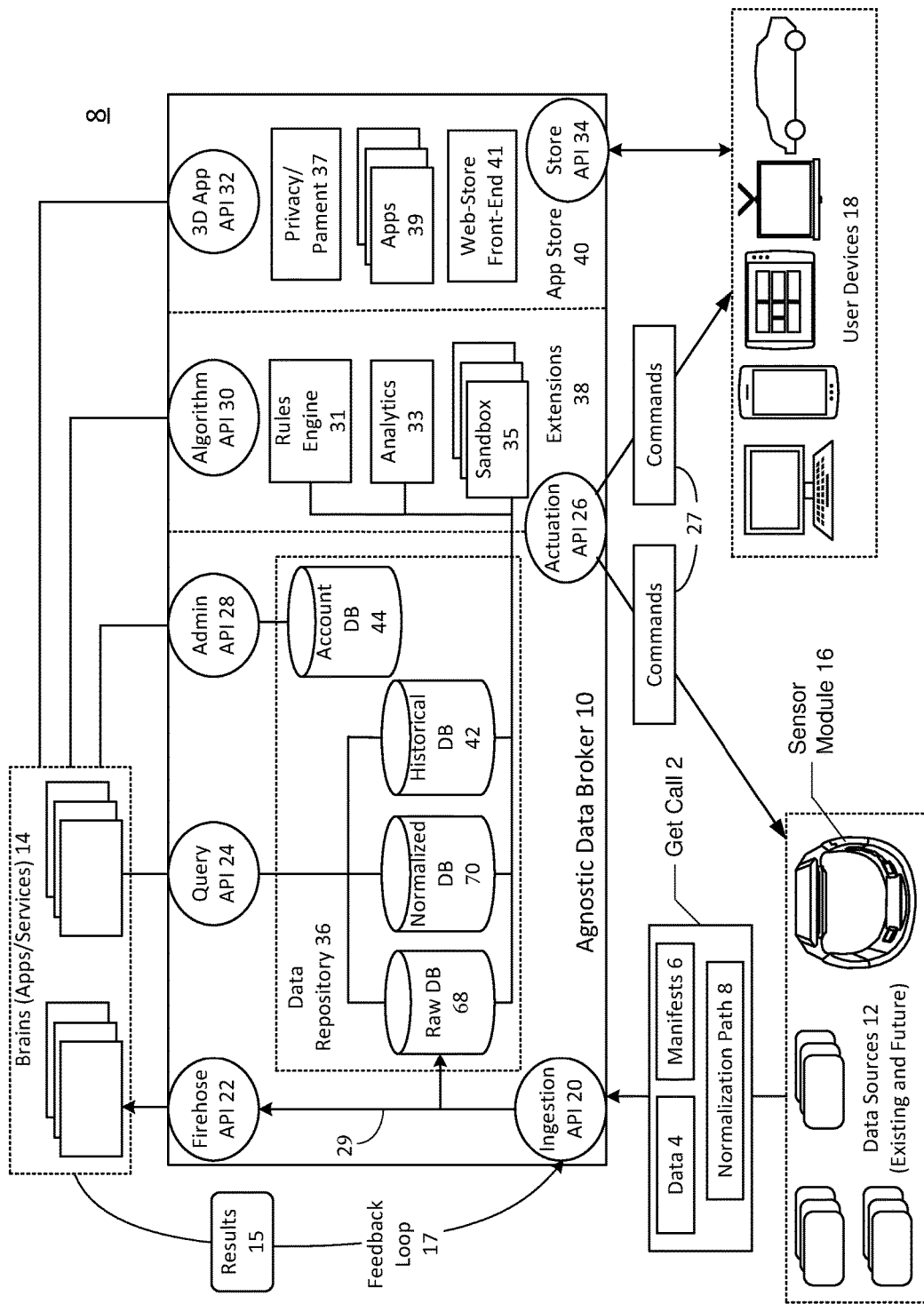
FIG. 3 is a diagram illustrating a system for implementing the agnostic data broker according to an exemplary embodiment.

FIG. 3 is a diagram illustrating a system 8 for implementing the agnostic data broker 10 according to an exemplary embodiment. The agnostic data broker 10 may be implemented using any number of application servers, web servers and/or database servers (not shown), each of which includes various processors and memory. In one embodiment, the agnostic data broker 10 may be implemented using scalable virtual machines in a public cloud. Commercially available cloud providers in the infrastructure as a service (IaaS) space include Amazon Web Services™ (AWS), Rackspace Public Cloud™ and Digital Ocean™ for example. In an alternative embodiment, the agnostic data broker 10 may be implemented on any type of standalone computer or user device that includes suitable resources.

Electronic communication with the agnostic data broker 10 via the API calls may occur using any type of private or public network (not shown). Examples of a public network include the Internet, while examples of wired and wireless networks may include local area networks (LANs), wireless local area networks (WLANs), wireless personal area networks (WPANS), wireless wide area networks, wireless mesh network, cellular networks, and a global area network (GAN).

According to one aspect of the exemplary embodiment, the agnostic data broker 10 provides software components and a set of application programming interfaces (APIs) that allow data sources 12, user devices 18 and brains 14 to electronically communicate with the agnostic data broker 10 via API calls in a manner where the data does not need to be defined ahead of time. In one embodiment, in addition to the ingestion API 20 and the query API 24, the agnostic data broker 10 may further include a firehose API 22, an actuation API 26, an admin API 28, an algorithm API 30, a 3D app API 32 and a store API 34.

In one embodiment, the agnostic data broker 10 may further include a data repository 36, extensions 38, and an app store 40. In one embodiment, the data repository 36 may comprise a raw database 68, a normalized database 70, a historical database 42, and an account database 44.

While the ingestion API 20 allows a large number of data sources 12 to transmit data to the agnostic data broker 10, the actuator API 26 is an interface by which the agnostic data broker 10 and the brains 14 send output to the data sources 12 and the user devices 18 by issuing actuator API calls. The actuation API calls cause commands 27 to be sent to specified data sources 12 and/or user devices 18. The output may comprise the data stored in the data repository 36 and/or results 15 calculated by the brains 14. In this context, actuation implies changing the state of something, whether displaying data on a screen or activating switch.

As examples of the foregoing, a user may have data sources 12 and user devices 18 on the user's body and in the user's house that are connected to that agnostic data broker 10. The data sources 12 may send their data to the agnostic data broker 10: for example: body sensors (health, activity . . . ), house sensors (temperature, humidity, alarm, open door, etc.), smart appliances (washing machine, TV, light, water sprinkler), mobile phone, energy consumption tracker, cameras, and the like. Some of the data from sources 12 and user devices 18 may be configured to receive commands 27 from the agnostic data broker 10 such as: smart appliances (coffee machine), lights, door locks, TVs, and the like.

As stated above, the ingestion API 20 allows a data source 12 to initiate an ingestion API call, referred to here as a Get Call 2, which pushes any type of data to the agnostic data broker 10 by sending the data 4, the manifest 6, and optionally the normalization path 8 as arguments. In one embodiment, the ingestion APIs may include various other calls, such as, for example an Open call that opens communication with the data broker, and a Close call that signals the sending of the data 4 has paused or ceased.

In one embodiment, the agnostic data broker 10 maintains user accounts and records for users and the data sources 12 in the account database 44. When a Get Call 2 is received from a particular data source 12, the data broker 10 stores the data 4 in the data repository 36, as described below, and searches the account DB 44 to determine if the data source 12 that made the call belongs to any existing account. If not, the data broker 10 may assign the data source 12 a device type ID identifying the type of device; a device ID identifying the specific device; and a user ID identifying an owner/manufacturer of the data source 12, and add the assigned IDs to a user account record in the account database 44.

In one embodiment, users (e.g., owners/manufacturers) of the data sources 12 may also use the admin API 28 to manually create and manage user accounts. In one embodiment, the account information for each user identifies the data sources 12 registered by the user and any registered user devices 18 associated with the user.

In one embodiment, the Get Call 2 may include the manifest file itself, and once received, the manifests 6 may also be stored in the account database 44 in the user account associated the sending data source 12. Many different data sources 12 and user devices 18 can be associated with each user, and one or more manifests 6 may be associated with each data source 12 describing the data produced by the data source 12.

In a further exemplary embodiment, rather than include a copy of the manifest file, the Get Call 2 may instead include a reference to the manifest 6. In one embodiment, the reference to the manifest 6 may comprise the manifest ID of an existing manifest 6 previously submitted and stored in the account DB 44 or a URL of the manifest.

When the agnostic data broker 10 receives data 4 through a Get Call 2, the data 4 is automatically stored in the raw database 68 as raw data, i.e., in its original format and structure, unmodified by the system. If a normalization path 8 is specified, then the raw data is also processed as specified and becomes normalized data that is stored in the normalized database 70. In one embodiment, the normalized data may be JSON (JavaScript Object Notation) formatted, with standardized field names and values. When the data 4 is stored in the data repository 36 the data is stored in association with the corresponding manifest ID. Any data sources 12 in the account DB may be "published" so the brains 14 may access the data sources 12 and their corresponding data.

In one embodiment, the brains 14 comprise apps and services that query and analyze the data stored in the data repository 36 and provide a service to users. The brains 14 may be implemented as backend cloud services or downloadable apps that can be plugged into the agnostic data broker 10 to provide additional, relevant functionality to the user. For example, one form of such a "plug in" brain 14 may include a subscription diet service based on data collected from multiple user data sources 12 (body sensors, tracked activity patterns, and the like). Another example may include a brain 14 that connects to and controls the lights in the user's house. A third-party company could provide a module (paid or not) that can enable the user to obtain better management (than the one offered by default by the platform) to turn on/off the lights based on the presence of people in the house, their activity, and the like.

Data from the data repository 36 that is analyzed and output by the brains 14 in the form of results 15 may be fed back into the agnostic data broker 10 by the brains 14 by issuing a Get Call 2 that includes the results 15 and a new manifest 6, thereby defining a feedback loop 17. The results 15 may be stored in the data repository 36, such as in the historical database 42, for use by other brains 14.

As an example, consider a company that has developed a biological sensor that transmits a user's biological data with a manifest 6 and is stored by the data broker. A third-party brain 14 access the data, computes some type of score from the data and sends the score with another manifest back to the data broker, where the score is stored and posted for use by others. In addition to posting, the score may be stored in the historical database 42. The data stored in the historical database may be combined with other data in other historical databases and operated on by other brains 14 to develop trends and patterns, for example. Accordingly, the agnostic data broker 10 allows third-parties to take advantage of this continuing ongoing feedback data.

The brains 14 may access and retrieve the data 4 stored in the data repository 36 using the query API 24 and the firehose API based on the stored manifest 6. In one embodiment, the calls made through the query APIs 24 may resemble database queries similar to SQL commands, for instance, since the data 4 is stored in databases such as the raw database 38, the normalized database 40, the historical database 42, and the account database 44. In response to receiving a query API call from a requesting brain 14, the agnostic data broker 10 retrieves the data and returns it to the requesting brain 14 through the actuation API 26.

According to one aspect of the embodiment, streaming data is stored as raw data in the raw database 68 and is simultaneously sent to an event queue 29 and made instantly available to the external brains 14 via the firehose API 22.

Figure 4:
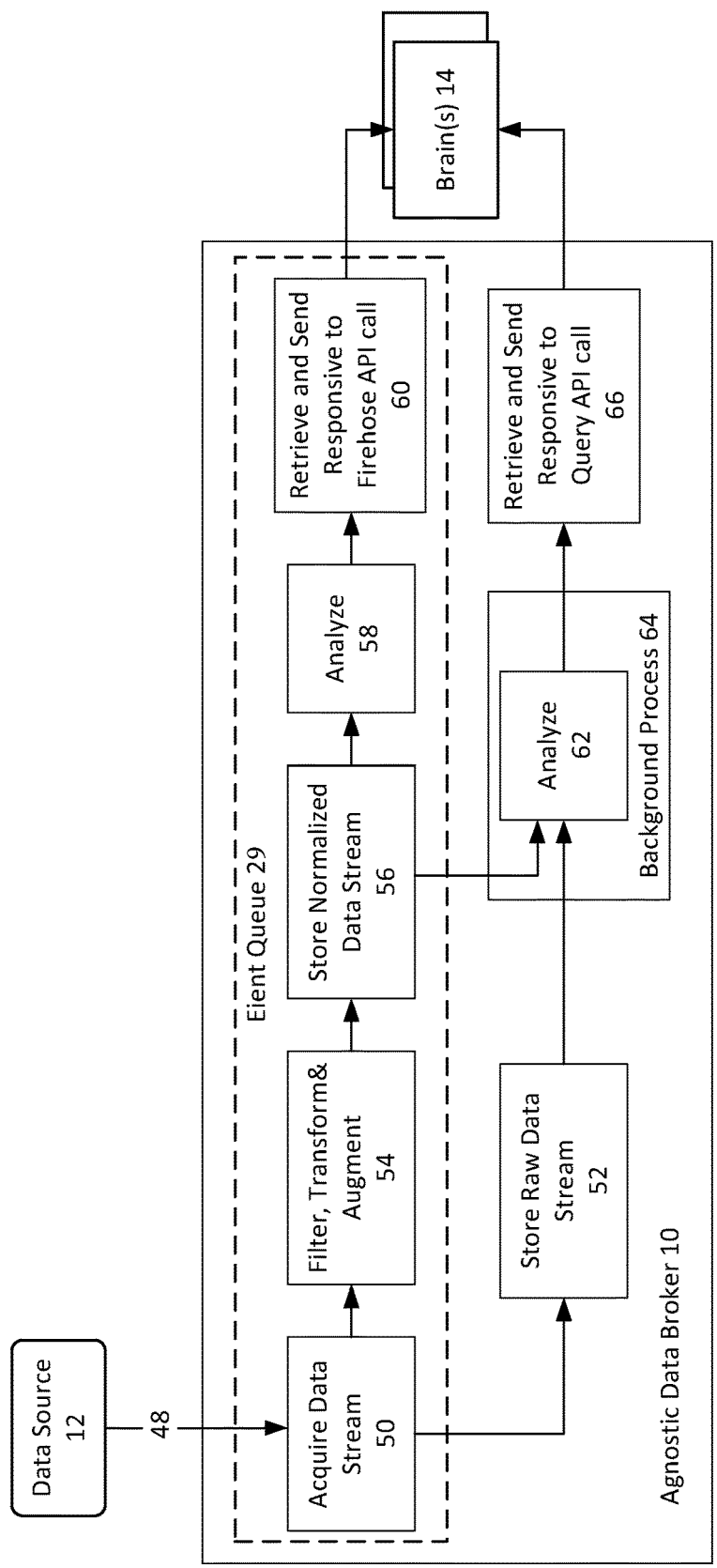
FIG. 4 is a flow diagram illustrating a process for real-time processing, storage and publication of streaming data.

FIG. 4 is a flow diagram illustrating a process for real-time processing, storage and publication of streaming data. The process may begin by acquiring a data stream 48, such as an audio/video stream or continuous heart rate data, from a data source 12 through an ingestion API call (block 50). In one embodiment an Open call may be used to open a stream/Web socket with the agnostic data broker 10 to transfer the data stream 48. As described above, the ingestion API call also includes a manifest 6 or reference thereto, and a normalization path 8.

The data stream 48 is simultaneously sent to the event queue 29 and stored in the raw database 68 (block 52). In the event queue 29, the data stream 48 may be filtered, transformed and augmented based on the normalization path 8 (block 54), and then stored in the normalization database 70 (block 56). The normalized streaming data may be analyzed in the real-time (block 58). In response to receiving a firehose API call from a requesting brain 14, the results of the analysis are retrieved and sent to the brain 14 in (block 60).

In one embodiment, the firehose APIs is a specialized for querying streams of data. When a firehose API call is received from a brain 14, the brain 14 is subscribed to a specific event or data stream in the event queue 29. This APIs referred to as a firehose because the event queue 29 may have a larger number of data streams or events available at any given time and the brain 14 subscribes only to the events of interest as specified in the firehose API call(s).

Any time after storage, the raw data and the normalized streaming data may be analyzed by a background process 64 (block 62). Responsive to receiving a query API call from a requesting brain 14, the agnostic data broker 10 retrieves and sends the results of the analysis to the brain 14 (block 66).

Referring again to FIG. 3, an example overview of the APIs provided by the agnostic data broker 10 will now be described. In one embodiment, each data source 12 may execute software that is configured to determine if a manifest 6 for the source device 12 exists on the data broker 10 by querying the data broker 10. For instance, one of the query APIs 15 may be referred to as "Does This Device Exist". When the data source 12 is activated, the software in the data source 12 queries the data broker 10 using a Does This Device Exist Call to determine if the manifest associated with the data source 12 exist. If the data broker 10 determines that the manifest is already present, the data broker 10 returns the manifest ID, e.g., ID#1. When the data source 12 submits data in a Get Call 2, the data source 12 includes the manifest ID, e.g., ID#1. The data broker 10 then retrieves the stored manifest 6 using the manifest ID and stores the data in the data repository 36 based on the stored manifest 6. In the case where the data is a stream, the data is made available as an event, e.g. event of type #1 data, via the firehose API 22. The firehose API 22 then publishes that event of type #1 data is available. A brain 14 written to analyze type #1 data uses the firehose API 22 or the query API 24 to access the data, analyze the data (e.g., to compute a user score) and then submits the analyzed data and it's type (e.g., type #72) for storage and/or presentation to the user through the actuation API 26. Another brain 14 may then aggregate the analyzed data from multiple users to determine trends etc., and makes that data available to the data broker via the feedback loop 17 and the ingestion API 20.

The agnostic data broker 10 may include extensions 38 to provide the brains 14 access to some high-level internal functions. Extension 38 can be considered as a cloud as a service within the data broker and are accessible to the brains 14 through the algorithm APIs 30. The extensions 38 may include a rules engine 31, analytics 33 and sandboxes 35, which are made available to the brains 14 for the execution of the algorithms within the data broker 10.

The sandboxes 35 are areas that where the brains 14 may post their algorithms having specific relationships to the stored data through the algorithm APIs 30, where the algorithms are the executed as virtual brains. The advantage of this is that the data on which the algorithms perform do not have to be transmitted from the data broker 10 to the external brains 14, saving transmission time for real-time applications. The sandboxes 35 provide access to the data in the data repository 36 locally in real-time so the data doesn't have to be transmitted back and forth. The algorithms in the sandboxes 35 are posted and others can use the algorithms that are already present in the sandboxes 35. Data output by the sandboxes 35 can be fed directly back into the data repository 36 for use by other brains, bypassing the feedback loop 17, thereby reducing delay. The extensions 38 in general may be monetized by renting CPU time within the data broker 10.

The app store 40 is an online store that provides access to the brains 14 as well as to downloadable apps. The app store 40 may include privacy/payment services 37, stored apps 39, and a web store front-end 41. One function of the app store 40 is to publish the existence of the brains 14 to allow access by others. The 3D App Store API 32 allows brains 14 to be published and or/stored. At the same time, a manifest describing the services offered by the brain 14 is also submitted. For example, if a particular service offered by a brain 14 requires a particular parameter when called, the manifest for the service will define the parameter. In one embodiment, a manifest for a service may be submitted by the author through the admin API 28 followed by the posting of the service through the 3D app API 32 for access through the web store front-end 41. The store API 34 allows users to query the brains/apps/services through the user devices 18. The store API 34 allows the users to query what services can be rendered to a particular user device 18 (as opposed to data sources 12 capable of only data submission). In another embodiment, user devices 18 may query the store API 34 and download apps automatically.

A method and system for an agnostic data broker has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD/Blu-ray disk, and executed by a processor. Accordingly, many modifications may be made by one of ordinary skill in the art without departing from the spirit and scope of the appended claims.

We claim:

1. A method for integrating data into an agnostic data broker comprising:
   ingesting the data from a data source, by at least one software component executing on at least one processor, by providing a first API through which a first API call is received that includes both the data and a manifest that describes a type of the data and a structure of the data, the type and the structure of the data being unknown to the agnostic data broker prior to the first API call being received in the agnostic data broker, the manifest describing the type and structure of the data to enable the agnostic data broker to accept and use the data;
   storing the data and the associated manifest in a data repository;
   providing a second API through which a second API call is received, the second API call querying the data using the manifest associated with the data to be queried, the second API call being issued by a device coupled with the agnostic data broker and different from the data source, the device being configured to analyze the data and generate results associated with the analysis of the data;
   ingesting results of the analysis of the data from the device by receiving a third API call at the first API that includes the results and a manifest associated with the results and describing a type and a structure of the results, the type and the structure of the results being unknown to the agnostic data broker prior to the third API call being received in the agnostic data broker; and
   storing the results and the associated manifest in the data repository.

2. The method of claim 1, further comprising: implementing the manifest as an XML file that describes the structure format of the data through an itemized list that defines whether the data is in discrete blocks or is a stream.

3. The method of claim 1, wherein the data and the manifest are arguments in the first API call.

4. The method of claim 1, further comprising: storing the data as raw data.

5. The method of claim 4, wherein the first API call further includes a normalization path that describes how the raw data is to be translated and stored.

6. The method of claim 1, wherein the device is a brain, the brain comprising at least one of an application and algorithm/service that analyze the data and wherein results of the analysis are fed back in to the agnostic data broker by the brain and mixed with other data from other data sources and other brains.

7. The method of claim 6, further comprising: providing access the data and various types of brains to users based on a fee-based subscription model.

8. The method of claim 1, further comprising: using a third API to send commands to at least one of the data source and user device.

9. The method of claim 6 wherein the brain includes at least one of backend cloud services and at least one downloadable app to be plugged into the agnostic data broker.

10. The method of claim 1, wherein the data comprises streaming data and the method further comprises:
    simultaneously sending the streaming data to an event queue and storing the streaming data in a raw database of the data repository;
    processing, at the event queue, the streaming data;
    storing the processed streaming data in a normalized database of the data repository; and
    making the streaming data in the raw data base and the processed streaming data in the normalized database available for query as the streaming data is being received.

11. An agnostic data broker system implemented using any combination of application servers, web servers and database servers, each of which includes various processors and memory, comprising:
    a first API through which a first API call is received for ingesting data from a data source, a type and a structure of the data is unknown to the agnostic data broker prior to the first API call being received in the agnostic data broker, the first API call including both the data and a manifest that describes the type of the data and the structure of the data to enable the agnostic data broker to accept and use the data;

a data repository for storing the data and the associated manifest; and a second API through which a second API call is received that queries the data using the manifest associated with the data to be queried, the second API call being issued by a device coupled with the agnostic data broker and different from the data source, the device being configured to analyze the data and generate results associated with the analysis of the data, wherein a third API call is received at the first API for ingesting results of the analysis of the data from the device, the third API call including the results and a manifest associated with the results and describing a type and a structure of the results, the type and the structure of the results being unknown to the agnostic data broker prior to the third API call being received in the agnostic data broker, and the results and the associated manifest are stored in the data repository.

12. The system of claim 11, wherein the manifest is implemented as an XML file that describes the structure format of the data through an itemized list that defines whether the data is in discrete blocks or is a stream.

13. The system of claim 11, wherein the data and the manifest are arguments in the first API call.

14. The system of claim 11, wherein the data is stored as raw data.

15. The system of claim 12, wherein the first API call further includes a normalization path that describes how the raw data is to be translated and stored.

16. The system of claim 11, wherein the device is a brain comprising at least one of an application and algorithm/service that analyze the data and wherein results of the analysis are fed back in to the agnostic data broker by the brain and mixed with other data from other data sources and other brains.

17. The system of claim 16, wherein access the data and various types of brains is provided to users based on a fee-based subscription model.

18. The system of claim 11, further comprising a third API that sends commands to at least one of the data source and user device.

19. The system of claim 16 wherein the brain includes at least one of backend cloud services and a downloadable app to be plugged into the agnostic data broker.

20. The system of claim 11, wherein the data comprises streaming data and the agnostic data broker system is configured to simultaneously send the streaming data to an event queue and store the streaming data in a raw database of the data repository, to process the streaming data at the event queue, to store the processed streaming data in a normalized database of the data repository, and to make the streaming data in the raw data base and the processed streaming data in the normalized database available for query as the streaming data is being received.

* * * * *